April 28, 1936. R. K. HOPKINS 2,039,167
WELDING ELECTRODE
Filed Nov. 17, 1933
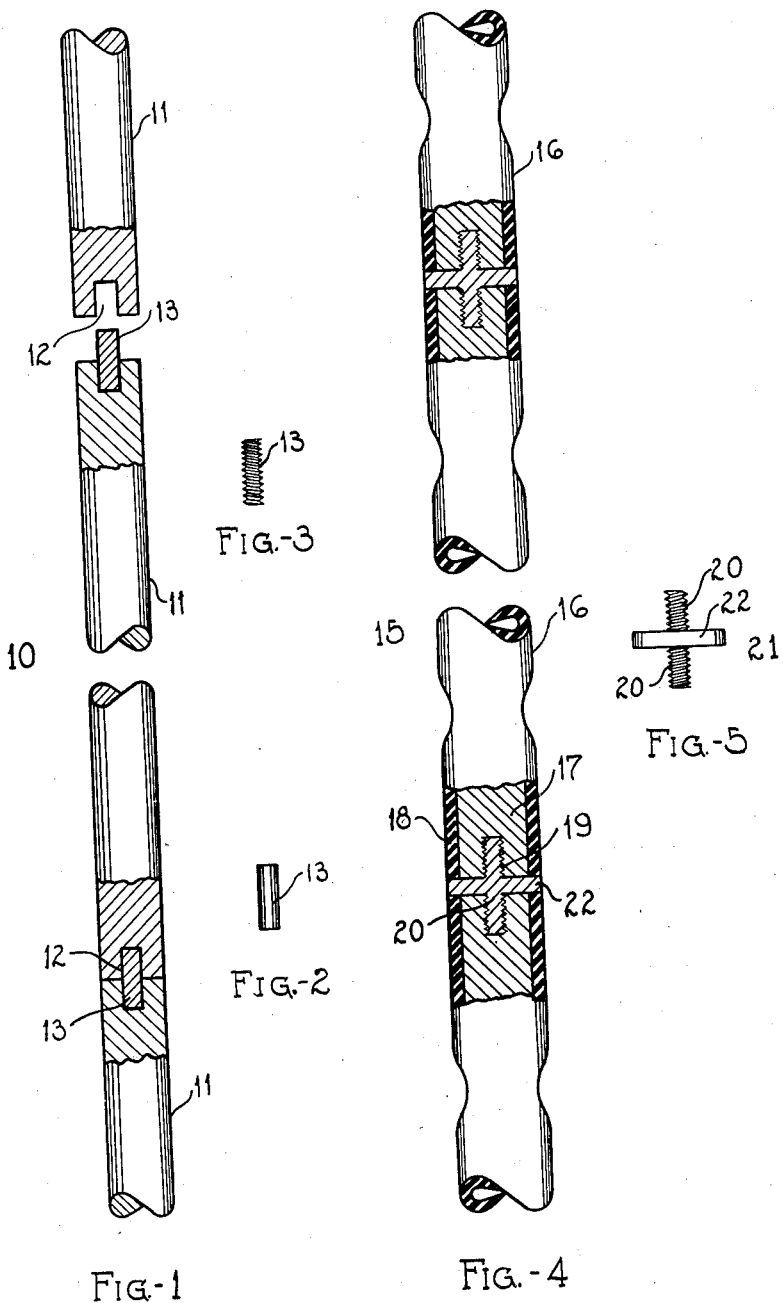

Patented Apr. 28, 1936

2,039,167

UNITED STATES PATENT OFFICE 2,039,167

WELDING ELECTRODE

Robert K. Hopkins, New York, N. Y., assignor to The M. W. Kellogg Co., New York, N. Y., a corporation of Delaware Application November 17, 1933, Serial No. 698,393

7 Claims. (Cl. 219—8)

This invention relates in general to electric arc welding and in particular to an improved arrangement for joining lengths of welding electrodes of the rod type.

When electric arc welding with welding electrodes of the rod type, if the operation is a continuous one, it is necessary from time to time to add welding electrode lengths to the welding electrode in the welding machine. For continuous and efficient welding the joints connecting the welding electrode lengths must be sufficiently strong mechanically to support a considerable portion of the welding electrode, also the joints must be such as to offer a current path of electrical resistance not appreciably higher than that of the other parts of the welding electrode. Furthermore, when using covered welding electrodes which include bare spots on the covering for the passage of the welding current to the metallic core, the joint forming arrangements must be such as to make it possible to easily and accurately align the bare spots of the welding electrode length with those of the welding electrode in the machine.

It is the usual present practice to join the welding electrode lengths by means of screw or friction joints the component parts of which are formed at the ends of the welding electrode. The male part of the joint is usually a straight or tapered stud whose surface may be plain, screw threaded, or scored. The female part is usually a recess suitably shaped to accommodate the male part. These joints are satisfactory when the electrode does not include bare spots which must be aligned and when the current densities are low. These joints are not satisfactory when the welding electrodes include bare spots which must be aligned for, first, if they are friction joints relative movement of the welding electrode lengths is not possible after the joint is formed, and second, if they are screw joints after the ends of the lengths abut no substantial movement is possible without stripping the threads or shearing the male member. These joints are not satisfactory with the very high current densities now generally used as it is not possible to so design both the male and the female end that there is metal enough in each of them to carry the current without undue heating.

It is an object of this invention to provide a simple arrangement for joining the ends of welding electrode lengths by means of which it is possible to produce joints that are mechanically as strong as need be and can carry even the highest current densities now employed without undue heating.

It is also an object of this invention to provide a simple arrangement for joining the ends of covered welding electrode lengths, which include bare spots, by means of which it is possible to align the bare spots without difficulty and without injury to the welding electrode or the joints.

The further objects and advantages of my invention will be better understood from a consideration of the description that follows taken with the accompanying drawing, in which Fig. 1 is a front elevation, partly in section, of a sectional welding electrode the lengths of which are joined together in accordance with my invention, Figs. 2 and 3 are front elevations of different types of the joint forming means used in Fig. 1, Fig. 4 is a front elevation, partly in section, of a covered welding electrode the lengths of which are joined together in accordance with my invention, and Fig. 5 is a front elevation of the joint forming means used in Fig. 4.

The welding electrode 10 of Fig. 1 is shown as made up of like sections or lengths 11 whose ends are recessed as at 12 to accommodate the ends of short studs 13. Lengths 11 may be covered with any of the protective covering compositions now used in the art or may be bare as shown. Lengths 11 may be made of any of the materials now used as filler metals in electrical arc welding. Recesses 12 are all substantially alike and are of such diameter that their walls include enough metal to allow passage of the welding current without appreciable heating.

Studs 13 are made of such length and diameter that they will snugly fit into a pair of recesses 12 and when so doing will join two sections 11 into a substantially unitary structure. If desired plain surfaced studs 13, shown in Fig. 2, or screw threaded studs 13, shown in Fig. 3, may be used, it being understood that if threaded studs 13 are used recesses 12 will also be screw threaded to accommodate them. Studs 13 are not made of the same metal as lengths 11 but are made of a metal which preferably has a higher electrical conductivity than that of the metal of lengths 11. Because of its low price, strength and other characteristics I prefer to make studs 13 of copper, however, if desired studs 13 may be made of any metal or alloy such as silver, aluminum, gold, bronze, brass and the like whose electrical conductivity is higher than that of the metal of lengths 11. Since copper is from ten to thirty times as electrically conductive as the metals and alloys out of which lengths 11 are made recesses 12 can be made of a diameter small enough to assure sufficient metal in the walls thereof to allow passage of the welding current without objectionable heating and yet also be assured that there is enough metal in studs 13 to allow passage of the welding current without objectionable heating. Welding electrode 10 may be assembled during the welding operation as is the present practice.

Welding electrode 15 is made up of a plurality of lengths or sections 16 each of which includes a metallic core 17 and a protective covering 18. Metallic core 17 may be made of any of the metals and alloys now used as filler materials in electric arc welding. Protective covering 18 may be made of any of the compositions now used to protect welding electrodes. Protective covering 18 is scored or otherwise removed at spaced intervals to expose small aligned areas of core 17 through which the welding current may be passed. At each end of sections 16 is a threaded recess 19 into which is adapted to screw threaded stud 20. Threaded studs 20 form part of a joint forming element 21 that includes disc 22. Joint forming element 21 is preferably made of copper because of its high electrical conductivity and softness, however, if desired joint forming element 21 may be made of any metal or alloy such as silver, gold, aluminum, brass, bronze and the like that is soft enough and has a sufficiently high electrical conductivity. Recesses 19 are made of a diameter to assure enough metal in their walls for passage of the welding current without objectionable heating.

Because of the comparative softness and malleability of the copper of element 21 when electrode 15 is assembled during the welding operation the sections 16 being joined may be rotated relative to each other as required to align the bare spots even after the ends of sections 16 abut disc 22. Because of their high electrical conductivity joint forming elements 13 and 21 need only be made thick enough to have the required mechanical strength. Thus no difficulty due to objectionable heating is experienced as there will be sufficient metal in the walls of recesses 12 and 19. The tendency to heat is further reduced when joint forming element 21 is used as disc 22 contacts with the adjacent ends of sections 16 and offers a current path of low resistance.

While my invention has been disclosed in connection with preferred embodiments thereof, obviously, many modifications and variations of the invention may be made without departing from the spirit and scope thereof, and therefore, only such limitations should be imposed as are indicated in the appended claims.

I claim:

1. An electric arc welding electrode comprising a plurality of like sections, each of said sections having a recess at each end thereof, and joining means in the recesses of the abutting ends of adjacent sections, said joining means being made of a substance whose electrical conductivity is higher than that of the metal of said sections.

2. An electric arc welding electrode comprising a plurality of like sections, each of said sections having a recess at each end thereof whose walls include sufficient metal to allow passage of the high current density welding currents nowadays employed without objectionable heating, and copper joining means in the recesses of abutting ends of adjacent sections.

3. An electric arc welding electrode comprising a plurality of like sections, each of said sections including a metallic core and a protecting covering therefor portions of which are removed at spaced intervals to expose aligned small areas of the core, said metallic core having a recess at each end thereof, joining means in the recesses of adjacent ends of contiguous sections and a soft metal disc forming a part of said joining means located between contiguous ends of adjacent sections.

4. An electric arc welding electrode comprising a plurality of like sections, each of said sections including a metallic core and a protecting covering therefor portions of which are removed at spaced intervals to expose aligned small areas of the core, said metalic core having a recess at each end thereof whose walls include sufficient metal to allow passage of the high current density welding current nowadays employed without objectionable heating, joining means in the recesses of adjacent ends of contiguous sections, and a soft metal disc forming a part of said joining means located between contiguous edges of adjacent sections, said joining means being made of a metal whose electrical conductivity is higher than that of the metal of said metallic core.

5. An electric arc welding electrode comprising a plurality of like sections each of said sections including a metallic core and a protecting covering therefor portions of which are removed at spaced intervals to expose aligned small areas of the core, said metallic core having a recess at each end thereof whose walls include sufficient metal to allow passage of the high current density welding current nowadays employed without objectionable heating, joining means in the recesses of adjacent ends of contiguous sections and a soft metal disc forming a part of said joining means located between contiguous edges of adjacent sections, said joining means being made of copper.

6. An electric arc welding electrode comprising a plurality of like sections, and means connecting the abutting ends of adjacent sections, said means being made of a substance whose electrical conductivity is higher than that of the metal of said sections.

7. An electric arc welding electrode comprising a plurality of like steel sections, and copper connecting means connecting the abutting ends of adjacent sections.

ROBERT K. HOPKINS.